June 4, 1929.  V. F. HARRIS  1,716,311
RUBBER TIRE FOR CASTERS
Filed May 13, 1926
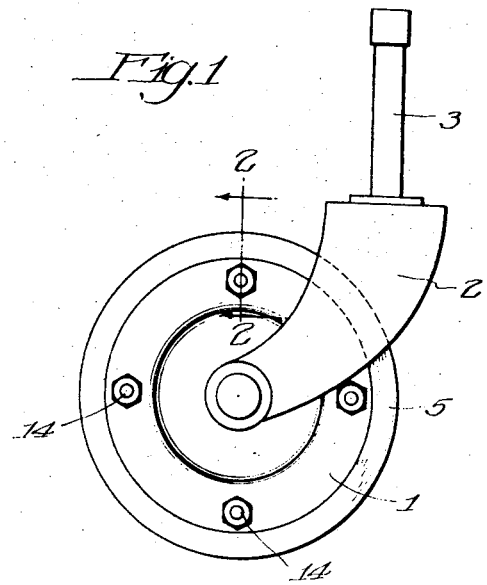
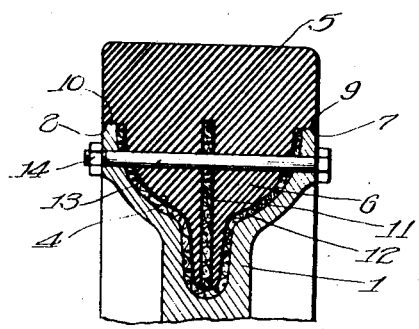
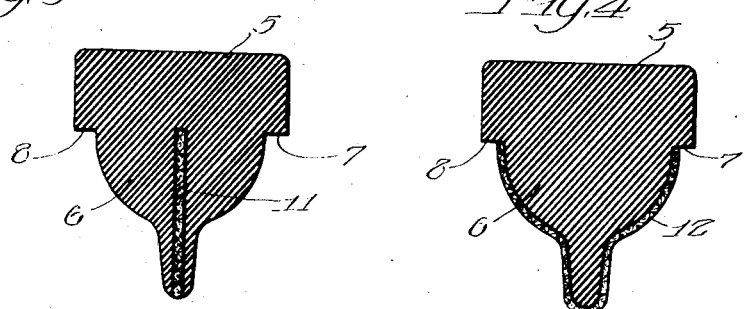
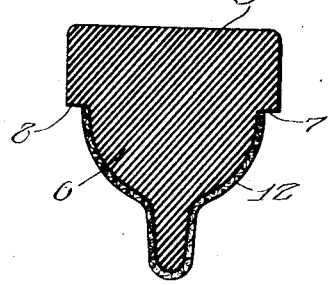
Inventor
Victor F. Harris
By Parker & Carter attys.

Patented June 4, 1929.

1,716,311

UNITED STATES PATENT OFFICE.

VICTOR F. HARRIS, OF CHICAGO, ILLINOIS, ASSIGNOR TO HARRIS & REED MANUFACTURING CO., OF CHICAGO, ILLINOIS, A CORPORATION OF ILLINOIS.

RUBBER TIRE FOR CASTERS.

Application filed May 13, 1926. Serial No. 108,848.

This invention relates to a rubber tire for casters and the like and has for its object to provide a new and improved device of this description. The invention has as a further object to provide a rubber tire for casters and the like which will be so stabilized in construction that the weights, pressures and strains brought upon it in actual service will not result in elongating or distorting the tire. The invention has as a further object to provide a tire capable of having the elasticity and cushioning of a rubber tire and at the same time providing a tire which shall have a long life. The invention has other objects which are more particularly pointed out in the accompanying description.

Referring now to the drawings:

Fig. 1 is a view showing a wheel with one form of tire embodying the invention;

Fig. 2 is an enlarged sectional view taken on line 2—2 of Fig. 1;

Fig. 3 is a sectional view showing a modified construction;

Fig. 4 is a sectional view showing a further modification.

Like numerals refer to like parts throughout the several figures.

For purposes of illustration I have shown the tire as applied to and forming part of a caster wheel. In this construction the wheel 1 is provided with a yoke 2 to which is connected a spindle 3 by means of which the wheel is attached to the device in connection with which it is used.

The wheel 1 is provided with a groove 4 which extends thereabout. The tire 5 is made of rubber and is provided with an inwardly projecting portion 6 which fits into the groove 4, of the wheel. The main body portion of the tire is formed of rubber. The tread portion of the tire is provided at its sides with inner flat faces 7 and 8 which engage the flat faces 9 and 10 of the wheel on opposite sides of the groove 4.

Embedded in the tire at the center portion thereof is a flexible non-metallic section 11 which is preferably of a fabric nature. For this purpose cotton duck or other suitable material may be used. This section 11 extends entirely around the tire and projects into the inwardly extending portion 6, as clearly shown in Fig. 2.

I may also provide a fabric member 12 which extends around the exterior of the inwardly projecting part 6. The tire may simply be expanded and placed on the wheel and held in position by inwardly projecting part 6, projecting into the groove 4. If desired holding devices such as the bolts 13 may be used, these bolts passing through a portion of the tire and the opposing sections of the wheel. In the particular construction shown, the portions 6 have laterally, outwardly curved faces which engage curved faces on the parts of the wheel at opposite sides of the vertical center line therethrough. The bolts may be provided with removable nuts 14 so that the tire may be removed if desired. If desired, I may use the central flexible section 11 alone as shown for example in Fig. 3, or the outer flexible section 12 as shown in Fig. 4.

It has been customary heretofore to make tires with various admixtures of materials in addition to rubber so as to form a compound having some of the characteristics of rubber but far less elastic. By means of this construction I am enabled to use the rubber without admixture of other material and thereby secure the full elasticity of the rubber and at the same time provide a tire which will not elongate or become distorted by the rough usage to which tires of this kind are subjected.

When the tire is connected to the wheel by the fastening devices which pass through the flexible non-metallic section, it becomes as it were practically an integral part of the wheel, and while affording great elasticity will remain in proper condition and give long satisfactory service.

I have described in detail a particular construction embodying the invention, but it is of course evident that it may be varied in many particulars without departing from the spirit of the invention as embodied in the claims hereto appended, and I therefore do not limit myself to the particular construction shown.

I claim:

1. A device of the kind described comprising a wheel having a tire receiving space at the periphery thereof, a tire having a tread section with wheel engagement faces substantially parallel with the axis of rotation of the tire, and which engage the periphery of the wheel and take part of the load, a second section of less width than the tread section and having laterally outwardly curved faces which engage curved faces of the tire receiving space of the wheel and take part of the load and a fabric section connected with said second section and projecting inwardly beyond the same into a narrower portion of the tire receiving space.

2. A device of the kind described comprising a wheel having a tire receiving space at the periphery thereof, a tire having a tread section with wheel engagement faces substantially parallel with the axis of rotation of the tire, and which engage the periphery of the wheel and take part of the load, a second section of less width than the tread section and having laterally outwardly curved faces which engage curved faces of the tire receiving space of the wheel and take part of the load, a fabric section embedded in said second section and projecting inwardly beyond the same into a narrower portion of the tire receiving space and fastening devices which pass through the fabric section and hold the engaging faces of the tire in contact with the engaging faces of the wheel.

Signed at Chicago, county of Cook, and State of Illinois, this 1st day of May, 1926.

VICTOR F. HARRIS.